(No Model.) 2 Sheets—Sheet 1.

O. SPELLMEYER.
WASHING MACHINE.

No. 599,023. Patented Feb. 15, 1898.

Attest:
M. F. Smith
S. G. Wells

Inventor:—
Otto Spellmeyer
By Higdon Longan & Higdon
Attys.

(No Model.) 2 Sheets—Sheet 2.
O. SPELLMEYER.
WASHING MACHINE.
No. 599,023. Patented Feb. 15, 1898.
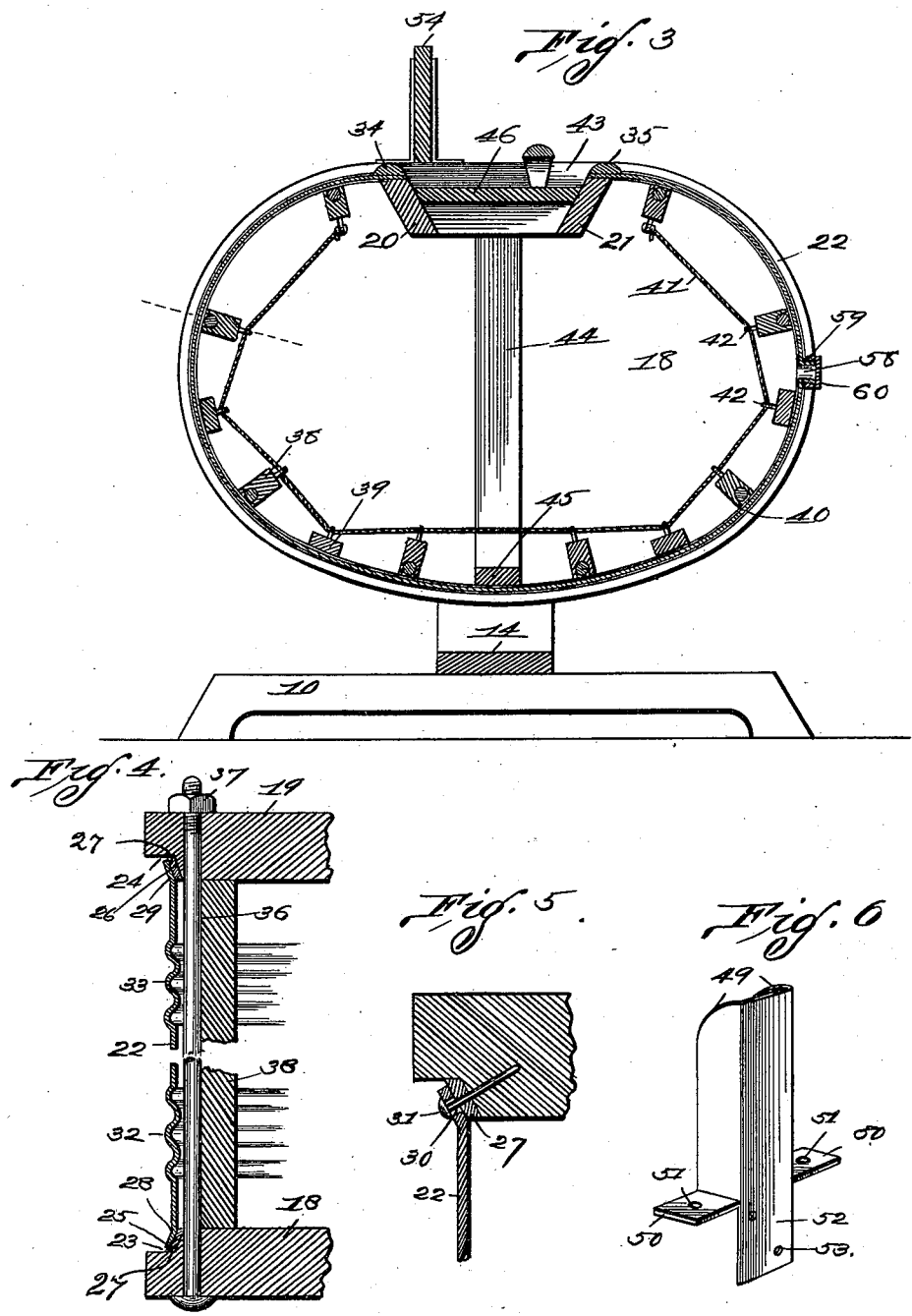
Attest
W. R. Smith
S. G. Wells
Inventor:-
Otto Spellmeyer
By Higdon, Longan & Higdon
attys.

UNITED STATES PATENT OFFICE.

OTTO SPELLMEYER, OF ST. LOUIS, MISSOURI.

WASHING-MACHINE.

SPECIFICATION forming part of Letters Patent No. 599,023, dated February 15, 1898.

Application filed August 24, 1896. Serial No. 603,806. (No model.)

*To all whom it may concern:*

Be it known that I, OTTO SPELLMEYER, of the city of St. Louis, State of Missouri, have invented certain new and useful Improvements in Washing-Machines, of which the following is a full, clear, and exact description, reference being had to the accompanying drawings, forming a part hereof.

My invention relates to washing-machines; and it consists in the novel construction, combination, and arrangement of parts hereinafter shown, described, and claimed.

Figure 1:
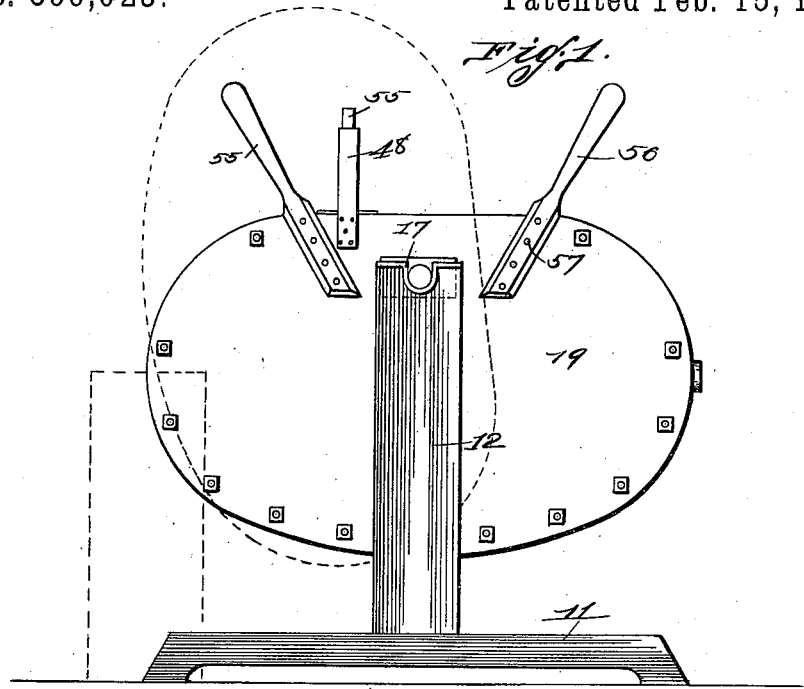
Figure 2:
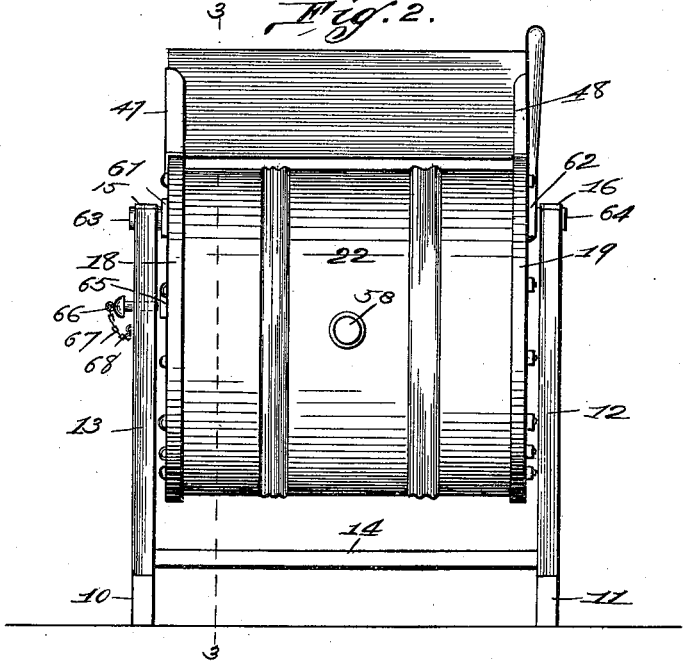

Figure 1 is a side elevation of my improved washing-machine. Fig. 2 is an end elevation of the machine shown in Fig. 1. Fig. 3 is a vertical sectional view on the line 3 3 of Fig. 2. Fig. 4 is an enlarged detail sectional view showing the method of connecting the sides together and of holding the cleats in position. Fig. 5 is an enlarged detail sectional view showing the method of connecting the sheet-metal body to the side pieces. Fig. 6 is a view in perspective of one of the wringer-board holders.

In the construction of my improved washing-machine I employ a frame consisting of the longitudinally-extending horizontally-positioned parallel base-blocks 10 and 11, and the vertical parallel bars 12 and 13 extend upwardly from the centers of said blocks 10 and 11, and the lower ends of said bars 12 and 13 are connected by the cross-bar 14. At the upper ends of the vertical bars 12 and 13 are plates 15 and 16, in the centers of which are the U-shaped bearings 17. The swinging portion of the washing-machine consists of the side pieces 18 and 19, which are substantially alike. Each one of the ends of the side pieces is a semicircle, while the bottom edges of said side pieces are segments of a circle somewhat larger than the circle described by the ends. The upper edges of the side pieces are straight.

Cross-pieces 20 and 21 are inserted between the upper edges of the side pieces 18 and 19, and the upper edges of said cross-pieces are inclined outwardly. The sheet-metal body 22 of the washing-machine has one of its ends attached to the upper edge of the cross-piece 20 and extends around between the side pieces 18 and 19 and near their edges to the upper edge of the cross-piece 21. The inner corners of the side pieces 18 and 19 are cut away, forming the notches 23 and 24, extending entirely around the edges of the side pieces from the upper edge of the cross-piece 20 to the upper edge of the cross-piece 21, and the edges of the body 22 are positioned in said notches 23 and 24. The surfaces 25 and 26, against which the sides of the edges of the body 22 rest, are inclined outwardly from the inner faces of said side pieces, as shown in Figs. 4 and 5. Strips of packing 27 are inserted in the notches 23 and 24 and against said inclined surfaces 25 and 26.

The outer edges 28 and 29 of the sheet-metal body 22 are slightly flared outwardly and said flared edges rest directly against the packing-strip 27. Apertures 30 are formed through said flared edges 28 and 29 of the body 22 and nails 31 are inserted through said apertures and driven through the packing 27 into the side pieces 18 and 19, as shown in Fig. 5. The apertures 30 are somewhat larger than the nails, thus forming a sliding connection between the sheet metal and the side pieces.

A series of wavy corrugations 32 and 33 are formed in parallel positions and some distance apart from end to end of the sheet-metal body 22. A semicircular cleat 34 is placed upon the upper face of the end of the sheet-metal body 22 above the cross-piece 20 and is securely nailed in position. A similar cleat 35 is placed against the upper surface of the opposite end of the sheet-metal body 22 and above the cross-piece 21 and is securely nailed in position. Bolts 36 pass through the side pieces 18 and 19 inside of the sheet-metal body 22, and nuts 37 are screw-seated upon the ends of said bolts, thus holding said side pieces adjustably together.

Upon the inside of the washing-machine are the cleats 38 and 39. The cleats 38 are high and narrow in cross-section, while the cleats 39 are low and broad in cross-section. In the rear sides of the cleats 38 are formed the grooves 40, designed to receive the bolts 36. The rear edges of the cleats 38 and 39 fit closely against the straight faces and upon the inner surface of the sheet-metal body 22, and the corrugations 32 and 33 form passage-ways behind said cleats for the water. The cleats 38 and 39 are removably positioned within the washing-machine and are held in position by tightening the nuts 37 upon the bolts 36.

Cords 41 are placed transversely of the cleats 38 and 39, one cord at each end of said cleats, and staples 42 are placed astride the cords 41 and driven into the cleats. One end of each of the cords is attached to the staples in the cleat which comes adjacent to the cross-piece 20, and the opposite end of said cord is attached to the staple which comes in the cleat adjacent to the cross-piece 21. The cords 41 hold the cleats together in a bundle when the nuts 37 are loosened, and said cleats may then be removed from the machine and cleaned or repaired.

The pieces 43 connect the ends of the cross-pieces 20 and 21, and the lower ends of said pieces 43 are inclined toward each other. The strengthening-strip 44 is vertically positioned against the inside of each of the side pieces 18 and 19, and is securely attached thereto to prevent said side pieces from warping. The lower ends of the strengthening-strips 44 are connected by the cleat 45, which is positioned inside of the sheet-metal body 22.

The cross-pieces 20 and 21 and the piece 43 form a flaring opening through the upper side of the washing-machine, and the cover 46 closes said opening.

The wringer-board holders 47 and 48 are placed in horizontal and transverse alinement and attached to the upper edges of the side pieces 18 and 19 above the cross-piece 20. The wringer-board holders 47 and 48 are constructed as shown in perspective in Fig. 6, and each consists of a channel-bar having the upper ends 49 of its flanges rounded and having the lower ends 50 of its flanges turned outwardly at right angles. The flanges 50 have apertures 51 and rest upon the upper edges of the side pieces, while the central part 52 of the channel-bar has apertures 53 and projects downwardly against the outer faces of said side pieces. Nails or screws are inserted through the apertures 51 and 53 and hold said wringer-board holders in position. The wringer-board 54 is removably inserted between the wringer-board holders 47 and 48 with the ends of the board in the channels of the holders. The wringer may be attached to the wringer-board in the ordinary way, and when it is desired to remove the wringer from the washer the board may also be removed with the wringer, and thus save the trouble of removing the wringer from the board.

The handles 55 and 56 are attached to the side piece 19 by means of the screws 57. At one end of the machine is an aperture 58 through the sheet-metal body 22 and a screw-threaded nipple 59 is attached to said body around said aperture, and said nipple is closed by a screw-threaded cap 60.

Blocks 61 and 62 are attached to the side pieces 18 and 19 in their longitudinal centers and near their upper edges, and pins 63 and 64 project outwardly from said blocks and act as spindles, and said pins operate in the bearings 17. A block 65 is attached to the side piece 18 in a vertical line below the block 61, and said block 65 has an aperture in its center. A pin 66 is positioned horizontally through the vertical bar 13 and in alinement with the aperture in the block 65. A chain 67 is attached to the head of said pin 66, and the opposite end of said chain is attached to the staple 68 in the vertical bar 13. When the machine is in operation, the pin 66 is pulled out of the vertical bar 13 and allowed to hang upon the chain 67. When it is desired to hold the machine from operating as required to operate the wringer, the pin 66 is pushed into the aperture through the vertical bar 13 and into the block 65.

My improved washing-machine operates in the ordinary way; but it possesses many advantages over the devices heretofore in use in point of construction. By using the bolt 36 an adjustable connection is formed between the side pieces which will allow for swelling and shrinking of the parts, and by making the cleats removable, as described, they may be readily taken out of the machine and cleaned or repaired, as circumstances require, and by corrugating the sheet-metal body passages are formed for water back of the cleats, and while said passages are ample for the flow of water they are not large enough to allow of the clothing being wedged in behind the cleats. The joints formed by the sliding connection between the sheet-metal body 22 and the side pieces are of especial importance, as they may be tightened from time to time by the operation of the nuts 37 upon the bolts 36, as required to keep said joints from leaking.

When it is desired to drain the water out of the washing-machine, it is tipped up on end, as shown in dotted lines in Fig. 1, and the wringer-board may be placed with one of its ends upon the floor and its upper end engaging under one of the nuts 37, and the machine may be left in this position until it has been thoroughly drained.

I claim—

In a washing-machine, the side pieces 18 and 19, the cross-pieces 20 and 21 inserted between the upper edges of said side pieces; the upper edges of said cross-pieces being inclined outwardly, and said side pieces 18 and 19 having their inner corners cut away and forming the notches 23 and 24 extending around the edges of said side pieces from the upper edge of said cross-piece 20 to the upper edge of the cross-piece 21, and said side pieces having the outwardly-inclined surfaces 25 and 26 in said notches 23 and 24; the strips of packing 27 inserted in the notches 23 and 24 and against said inclined surfaces 25 and 26, the sheet-metal bottom 22 having one of its ends attached to the upper edge of the cross-piece 20 and extending around between the side pieces 18 and 19 and having its opposite end attached to the upper edge of the cross-piece 21; the side edges of said sheet-metal bottom being flared outwardly and engaging against said strips of packing 27, and said flared edges having the elongated apertures 30; the nails 31 inserted through said elongated apertures and through the packing 27 into said side pieces 18 and 19; said apertures 30 being somewhat larger than said nails and thus forming a sliding connection between said sheet-metal bottom and said side pieces; the bolts 36 inserted through said side pieces and inside of said sheet-metal bottom and forming an adjustable connection between said side pieces, the cleats 38 and 39 inserted against the inner face of said sheet-metal bottom with their ends engaging the inner faces of said side pieces and said cleats being held removably in position by the tension of said bolts, and the cords 41 placed transversely of, and attached to, said cleats 38 and 39 as required to bind said cleats together, substantially as specified.

In testimony whereof I affix my signature in presence of two witnesses.

OTTO SPELLMEYER.

Witnesses:
EDWARD E. LONGAN,
MAUD GRIFFIN.